(12) United States Patent
Sukegawa et al.

(10) Patent No.: US 6,435,602 B1
(45) Date of Patent: Aug. 20, 2002

(54) STRUCTURE FOR ATTACHING PILLAR GARNISH

(75) Inventors: Akihiro Sukegawa; Kiyoshi Kuramochi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,852

(22) Filed: Aug. 24, 2000

(30) Foreign Application Priority Data

Sep. 3, 1999 (JP) .......................................... 11-250148

(51) Int. Cl.[7] .......................... B60J 7/00; B60K 37/00; B60N 2/00; B60N 3/00; B60R 27/00
(52) U.S. Cl. ...................................... 296/191; 52/573.1
(58) Field of Search ............................ 296/191; 24/292, 24/295, 297; 52/716.5, 309.1, 573.1

(56) References Cited

U.S. PATENT DOCUMENTS

| | | | |
|---|---|---|---|
| 2,184,249 A | * | 12/1939 | Churchill |
| 3,208,119 A | * | 9/1965 | Seckerson |
| 4,707,020 A | * | 11/1987 | Enokida et al. |
| 5,229,175 A | * | 7/1993 | Seabolt |
| 5,319,839 A | * | 6/1994 | Shimajiri |
| 5,353,571 A | * | 10/1994 | Berdan et al. |
| 5,704,753 A | * | 1/1998 | Ueno |
| 5,791,716 A | * | 8/1998 | Takagi et al. |
| 5,992,914 A | * | 11/1999 | Gotoh et al. |
| 6,141,837 A | * | 11/2000 | Wisniewski |

* cited by examiner

*Primary Examiner*—Joseph D. Pape
*Assistant Examiner*—Scott Carpenter
(74) *Attorney, Agent, or Firm*—Arent Fox Kintner Plotkin & Kahn, PLLC

(57) ABSTRACT

In a structure for attaching a pillar garnish according to the present invention, the structure includes: a reference attaching portion; a plurality of first movable attaching portions provided on a door side in a widthwise direction of the pillar garnish; and a plurality of second movable attaching portions provided on an widthwise outer side away from the door. Each of the first movable attaching portions allows only the thermal expansion and contraction of the pillar garnish in its longitudinal direction, while each of the second movable attaching portions allows the thermal expansion and contraction of the pillar garnish in its widthwise and longitudinal directions. In addition, since the arrangement provided is such that, at the second movable attaching portions, the pillar garnish is attached in such a manner as to urge the pillar garnish toward a widthwise reference position.

6 Claims, 5 Drawing Sheets

STRUCTURE FOR ATTACHING PILLAR GARNISH

BACKGROUND OF THE INVENTION

1. Field of the Invention

The present invention relates to a structure for attaching a pillar garnish of a long size for covering the surface of a pillar of a door section of an automobile, and more particularly to a structure for attaching a pillar garnish suitable for a case where a coefficient of linear expansion is different from that of a frame of a pillar.

2. Description of the Related Art

When members having different coefficients of linear expansion are attached, it is necessary to take into consideration the relief at the time of thermal expansion. For example, in a case where a pillar garnish formed of a resin is attached to a pillar of a door section formed of a metal, in a conventional method the pillar garnish is fitted to the frame of the pillar in such a manner as to be longitudinally slidable, clips are used to prevent the pillar garnish from coming off in directions other than the sliding direction and restrict its range of sliding in the sliding direction, and it has been the general practice to attach the pillar garnish to the frame by means of elongated holes and bolts having steps and make it longitudinally slidable.

However, since the shape of the frame of the pillar and the shape of the pillar garnish are not simple, the directions of their thermal expansion and contraction are not necessarily fixed due to the environment and the like. In particular, there are cases a gap is produced on the outer surface and the aesthetic feature is hence impaired due to the fact that it was impossible to grasp the expansion and contraction in the widthwise direction. In some cases, there is a risk that the pillar garnish can disadvantageously interfere with the door when it has undergone expansion.

SUMMARY OF THE INVENTION

The invention has been devised to overcome the above-described problem of the conventional art, and its object is to provide a structure for attaching a pillar garnish which, with a simple structure, makes it possible to prevent the pillar garnish from interfering with the door and the aesthetic feature of the outer surface (design feature) from becoming impaired.

DETAILED DESCRIPTION OF THE PREFERED EMBODIMENT

To attain the above object, in accordance with the invention, there is provided a structure for attaching a pillar garnish 3 of a long size for covering a surface of a pillar 2 of a door section of an automobile, the structure comprising: a plurality of first movable attaching portions 7 provided on a door side in a widthwise direction of the pillar garnish 3; and a plurality of second movable attaching portions 8 provided on an widthwise outer side away from the door, wherein each of the first movable attaching portions 7 allows only the thermal expansion and contraction of the pillar garnish 3 in its longitudinal direction, while each of the second movable attaching portions 8 allows the thermal expansion and contraction of the pillar garnish 3 in its widthwise and longitudinal directions. Consequently, it is possible to control the expanding and contracting directions of the pillar garnish 3 during its thermal expansion and contraction, thereby making it impossible to interfere with the door. In addition, if an arrangement is provided such that, at the second movable attaching portions 8, the pillar garnish 3 is attached in such a manner as to urge the pillar garnish 3 toward a widthwise reference position. Consequently, when the pillar garnish 3 returns to its original shape after having undergone thermal expansion (contraction), the pillar garnish 3 returns to its original position reliably.

Referring now to the accompanying drawings, a detailed description will be given of a preferred embodiment of the invention.

Figure 1:
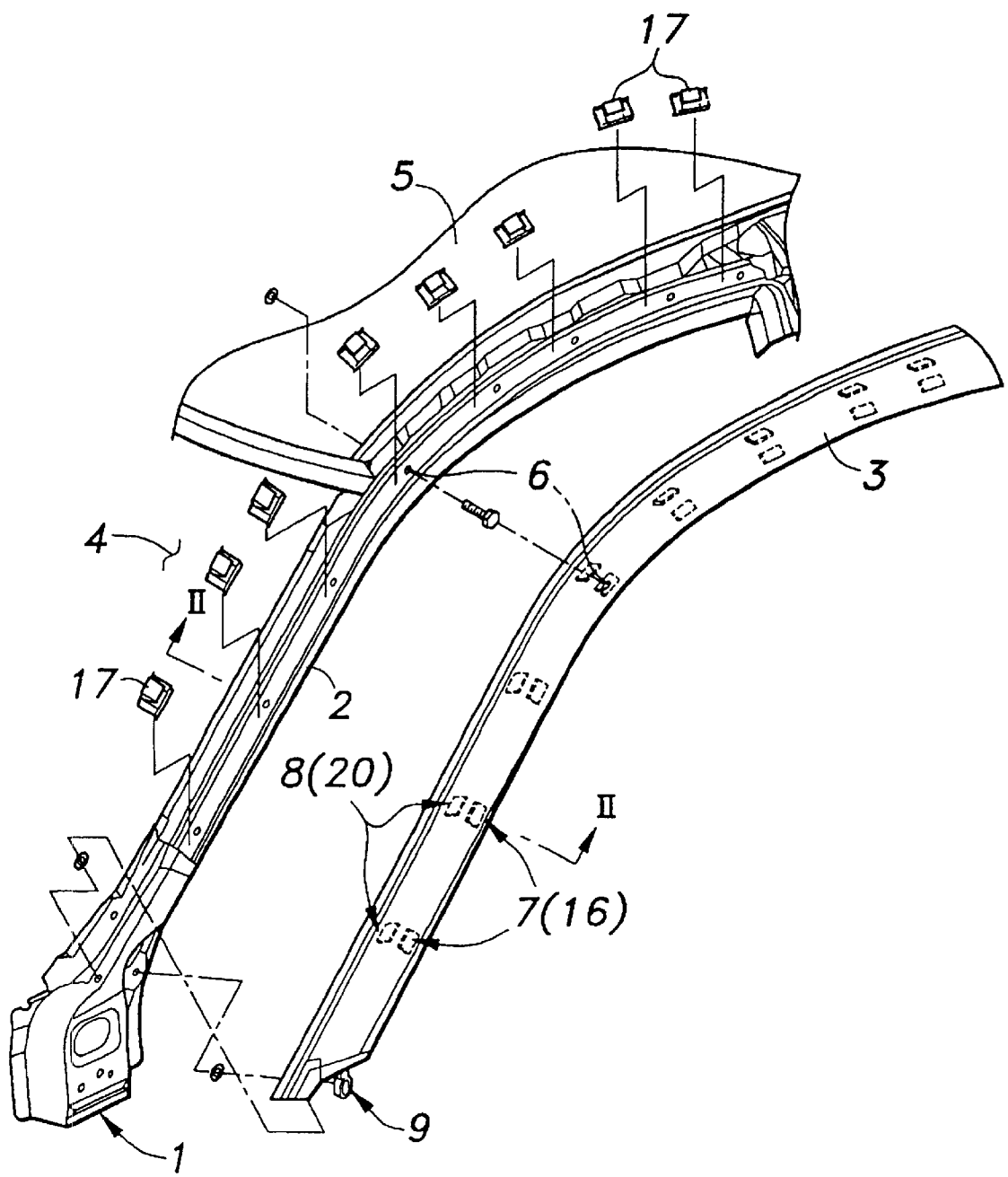
FIG. 1 is a partial exploded perspective view illustrating the structure of essential portions of a front pillar of an automobile to which the invention is applied.
Figure 2:
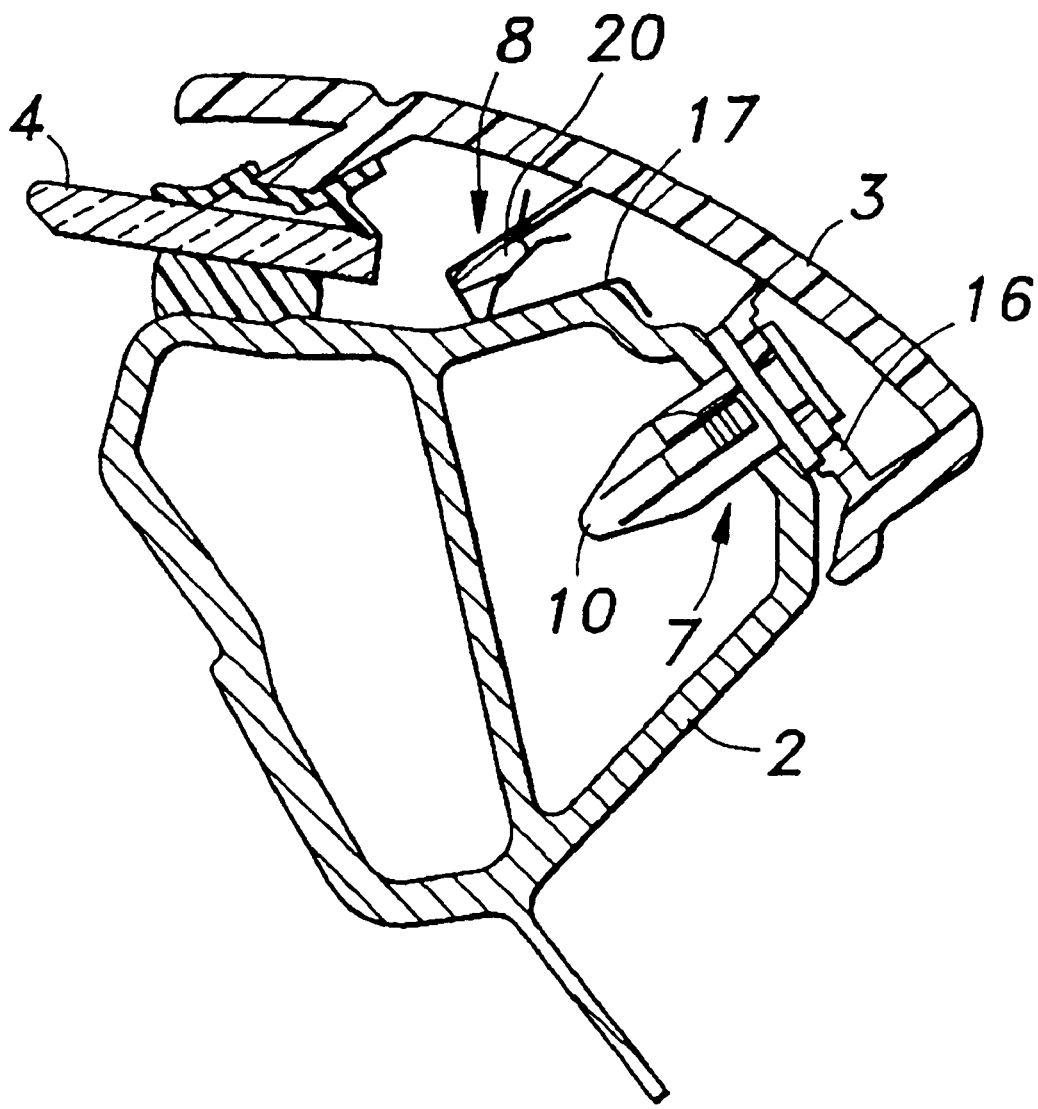
FIG. 2 is a cross-sectional view taken along line II—II in FIG. 1.

FIG. 1 is a partial exploded perspective view illustrating a structure ranging from a fender to a roof of an automobile to which the invention is applied. A frame 2 of a front pillar of a vehicle body 1 is formed of an aluminum alloy material, and extends from a windshield 4 to a roof panel 5. Further, an outer surface of the frame 2 is covered with a front pillar garnish 3 formed of a resin. The front pillar garnish 3 is attached to the frame 2 by a reference attaching portion 6 located in the vicinity of a longitudinal center of the front pillar garnish 3, a plurality of first movable attaching portions 7 on a door (not shown) side, a plurality of second movable attaching portions 8 on an widthwise outer side away from the door, and a front-side end attaching portion 9. The front pillar garnish 3 at the reference attaching portion 6 is secured by being screwed down, and the front pillar garnish 3 at the first movable attaching portions 7 and the second movable attaching portions 8 is attached by clips 10 and 17, which will be described later, in such a manner as to be thermally expandable (FIG. 2). The front pillar garnish 3 at the front-side end attaching portion 9 is screwed down in such a manner as to be thermally expandable in the longitudinal direction by being bolted through an elongated hole.

Figure 3:
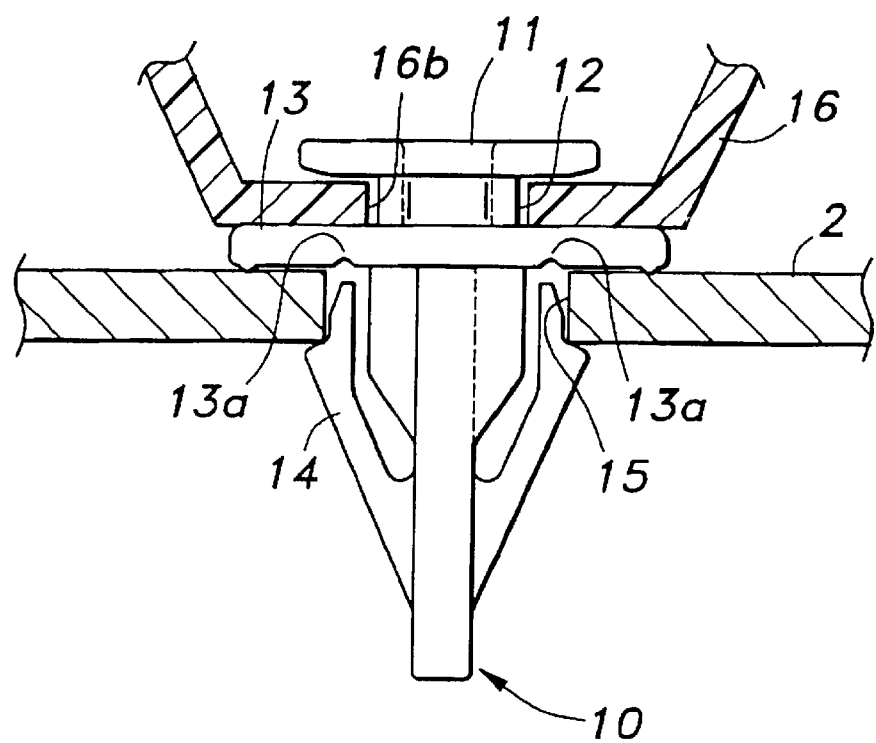
FIG. 3 is a partial enlarged cross-sectional front view of a first movable attaching portion.
Figure 4:
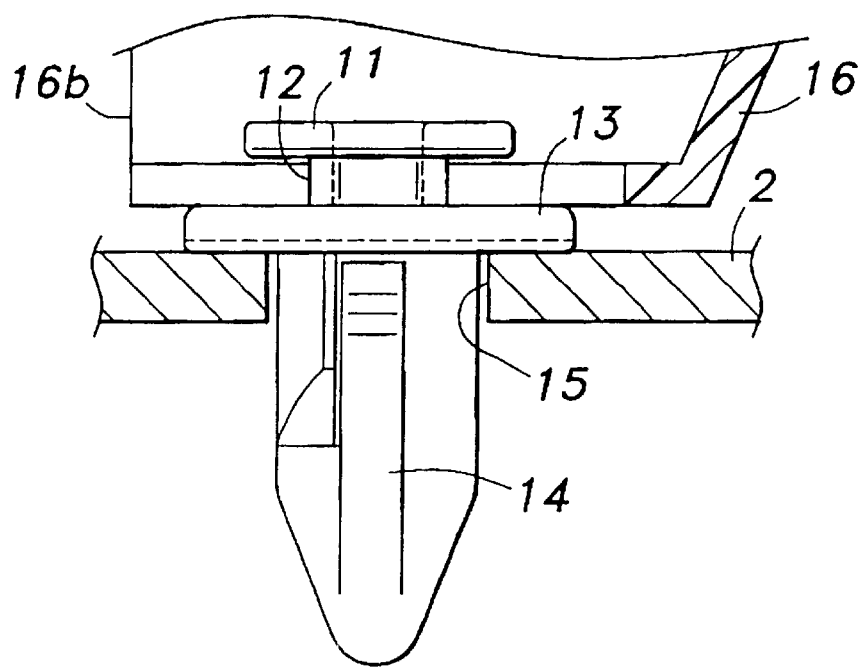
FIG. 4 is a partial cross-sectional side view illustrating the structure of the first movable attaching portion together with FIG. 3.
Figure 5:
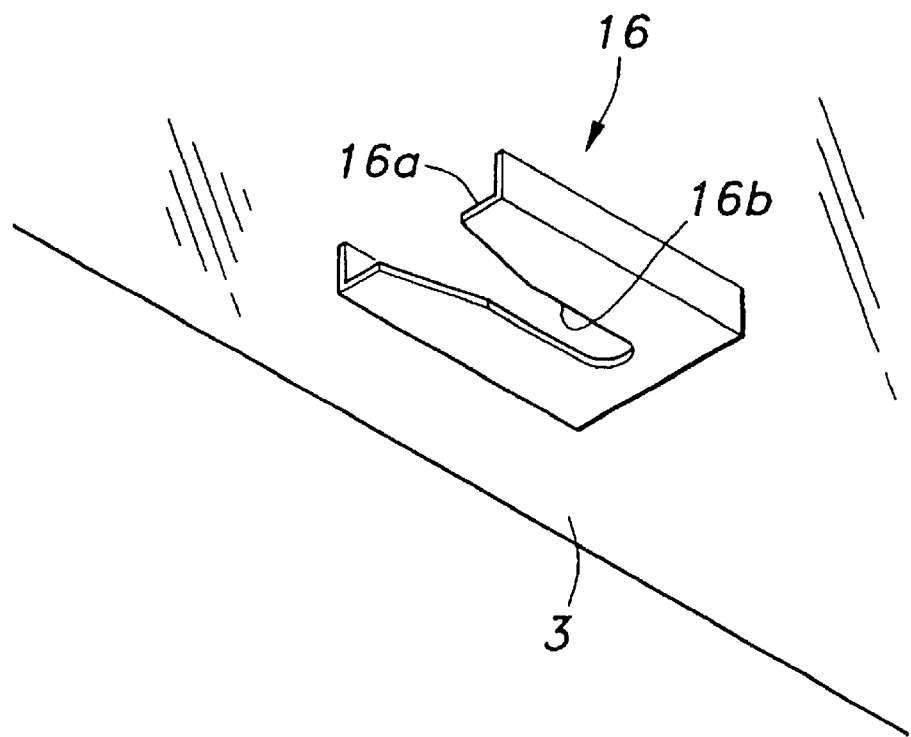
FIG. 5 is a perspective view illustrating the structure of a corresponding engaging portion for the first movable attaching portion.

As shown in FIGS. 3 and 4, the clip 10 used in each of the first movable attaching portions 7 on the door side is a resin clip in which a first enlarged head portion 11, a neck portion 12, a second enlarged head portion 13, and a resiliently engaging pawl portion 14 are formed in that order. Correspondingly, an engaging hole 15 is formed in the frame 2, while a corresponding engaging portion 16 is formed on the front pillar garnish 3. The engaging hole 15 is for allowing the resiliently engaging pawl portion 14 to engage therewith. As shown in FIG. 5, the corresponding engaging portion 16 has on one side an opening 16a where the first enlarged head portion 11 enters, as well as a slit 16b extending in the longitudinal direction of the front pillar garnish 3 to engage with the neck portion 12.

The respective clips 10 are first held onto the frame 2, and the front pillar garnish 3 is engaged therewith, thereby effecting attachment at the first movable attaching portions 7. To hold each of the clips 10 onto the frame 2, it suffices if the resiliently engaging pawl portion 14 is made to resiliently engage in an engaging hole 2a of the frame 2 while the resiliently engaging pawl portion 14 is pressed down by the second enlarged head portion 13. Then, each of the first enlarged head portions 11 is inserted into the opening 16a of the corresponding engaging portion 16, thereby completing the attachment at the first movable attaching portions 7. In this state, the front pillar garnish 3 is slidable in its longitudinal direction.

Figure 6:
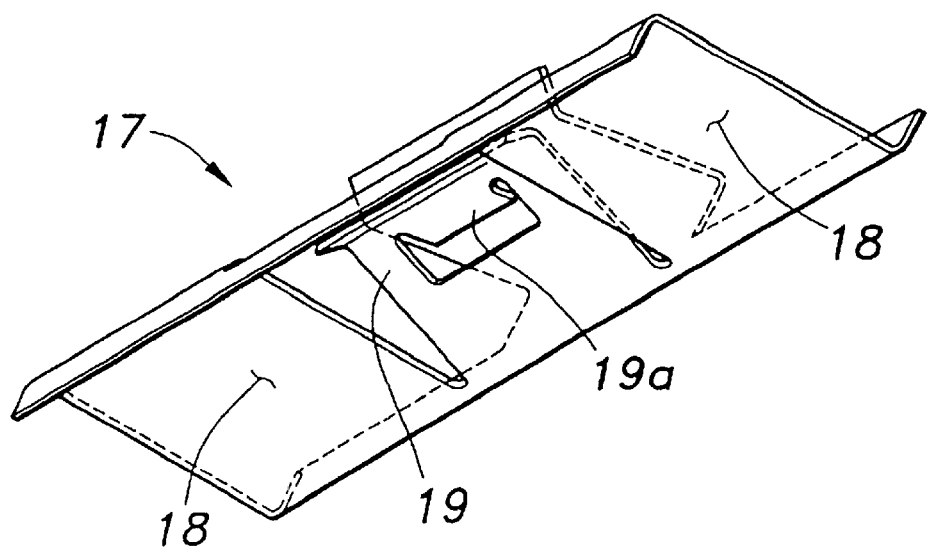
FIG. 6 is a perspective view illustrating the structure of a clip used in a second movable attaching portion.

Meanwhile, as shown in FIG. 6, the clip 17 used in each of the second movable attaching portions 8 on the widthwise outer side away from the door is a metal clip which has a bonding surface portion 18 for being bonded to the frame 2 as well as a clamping portion 19 which is tiltable from a reference position located at a certain angle from the bonding surface 18, and is adapted to be urged toward this reference position by the spring characteristic of its own. Correspondingly, tongues 20 are formed on the front pillar garnish 3. Although FIG. 6 shows the structure of the clip 17 located adjacent to the windshield 4, in the case of the clip 17 located adjacent to the roof panel 5, only the reference position (angle) of the clamping portion 19 differs, and its structure is similar.

The respective clips 17 is first held onto the frame 2, and the front pillar garnish 3 is engaged therewith, thereby effecting attachment at the second movable attaching portions 8. To hold each of the clips 17 onto the frame 2, the bonding surface portion 18 is bonded to the frame 2 by a pressure sensitive adhesive tape, an adhesive agent or the like. Then, the tongue 20 is inserted into the clamping portion 19 so as to be clamped, thereby completing attachment at the second movable attaching portions 8. Here, a cutout catch 19a is formed on the clamping portion 19 so as to prevent the tongue 20 from coming off. In this state, the front pillar garnish 3 is slidable in its longitudinal direction, and its expansion and contraction in the widthwise direction are possible within the tiltable range of the clamping portion 19.

By effecting the attachment at the first and second movable attaching portions 7 and 8 and by fixing the front pillar garnish 3 by screwing it down at the reference attaching portion 6, the front pillar garnish 3 is slidable in its longitudinal direction with the reference attaching portion 6 serving as a fixed point, and its expansion and contraction in the widthwise direction are possible. Here, since the widthwise contraction at the reference attaching portion 6 and the first movable attaching portions 7 are impossible, the actual expansion and contraction, particularly the expansion, in the widthwise direction takes place outwardly away from the door with the reference attaching portion 6 and the first movable attaching portions 7 serving as fixed points. In addition, the front pillar garnish 3 later returns to its original position and shape by the urging force of the clips 17.

Incidentally, when the front pillar garnish 3 is removed for the purpose of replacement or the like, the clips 17 of the movable attaching portions 8 can be easily removed by pulling out the tongues 20 from the clamping portions 19 or peeling off the bonding surface portions 18. As for the clips 10, however, since the resiliently engaging pawl portions 14 are located inside the frame 2, there is a risk that the clip 10 may possibly become separated between the first enlarged head portion 11 and the neck portion 12 and between the second enlarged head portion 13 and the resiliently engaging pawl portion 14 depending on the strength and structures of various portions, so that the resiliently engaging pawl portion 14 is left inside the frame 2, causing the occurrence of abnormal noise later.

Figure 7A:
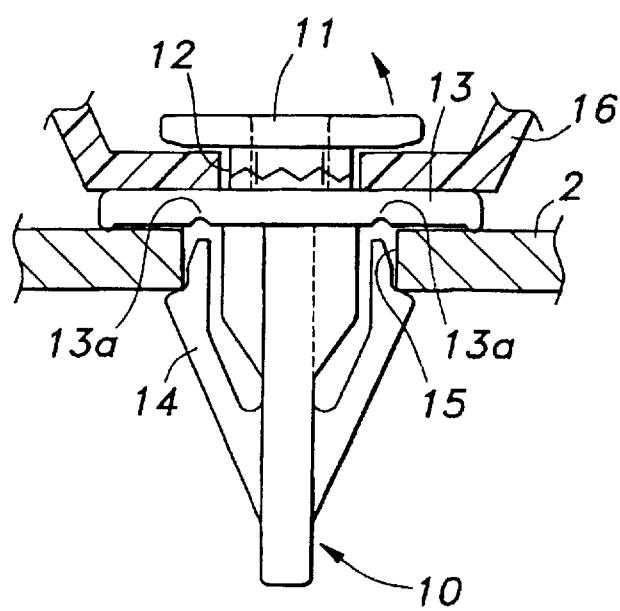
FIGS. 7A, 7B, and 7C are diagrams similar to FIG. 3 and explaining the procedure of attaching and detaching the clip used for the first movable attaching portion.
Figure 7B:
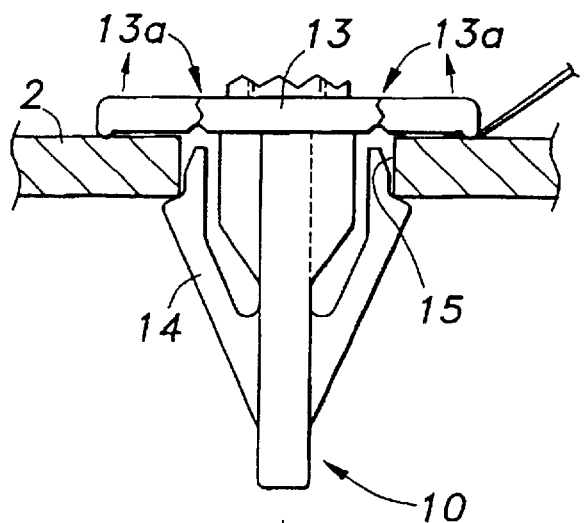
Figure 7C:
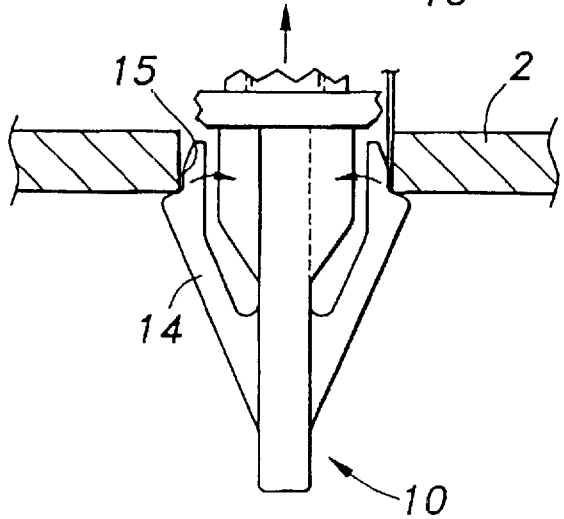

Therefore, in this arrangement, the neck portion 12 is made relatively weak. In addition, a thin-walled portion 13a is formed in the second enlarged head portion 13. Consequently, as shown in FIG. 7A, the neck portions 12 are broken by a screwdriver or the like to remove the front pillar garnish 3. Then, a portion of each second enlarged head portion 13 is broken at the thin-walled portion 13a to expose the resiliently engaging pawl portion 14 (FIG. 7B), and the resiliently engaging pawl portion 14 is pried to cancel its engagement (FIG. 7C). Then, if the clip 10 is pulled in the pulling-out direction, the clip 10 can be easily removed.

As is apparent from the foregoing description, in accordance with the structure for attaching a pillar garnish, the structure comprises: a reference attaching portion; a plurality of first movable attaching portions provided on a door side in a widthwise direction of the pillar garnish; and a plurality of second movable attaching portions provided on an widthwise outer side away from the door. Each of the first movable attaching portions allows only the thermal expansion and contraction of the pillar garnish in its longitudinal direction, while each of the second movable attaching portions allows the thermal expansion and contraction of the pillar garnish in its widthwise and longitudinal directions. Accordingly, it is possible to easily control the expanding and contracting directions during thermal expansion and contraction of the pillar garnish, particularly the expansion and contraction in the widthwise direction, thereby making it possible to prevent interference with the door. In addition, since the arrangement provided is such that, at the second movable attaching portions, the pillar garnish is attached in such a manner as to urge the pillar garnish toward a widthwise reference position, when the pillar garnish returns to its original shape after having undergone thermal expansion (contraction), the pillar garnish returns to its original position reliably, so that the aesthetic feature improves appreciably.

What is claimed is:

1. A structure for attaching a pillar garnish to a pillar door section of an automobile, the structure comprising:
   a pillar garnish;
   a plurality of first movable attaching portions having a plurality of engaging portions, is provided on the pillar garnish, said plurality of engaging portions having an opening and a slit extending in the longitudinal direction of the pillar garnish; and
   a plurality of second movable attaching portions having a plurality of tongues, is provided on the pillar garnish;
      wherein each of said first movable attaching portions allows only the thermal expansion and contraction of said pillar garnish in a longitudinal direction, while each of said second movable attaching portions allows the thermal expansion and contraction of said pillar garnish in a widthwise and longitudinal direction;
      and wherein the widthwise expansion is outwardly away from the pillar door section.

2. The structure for attaching a pillar garnish according to claim 1, wherein said second movable attaching portions attach said pillar garnish in such a manner as to urge said pillar garnish toward a widthwise reference position.

3. The structure for attaching a pillar garnish according to claim 1, wherein clips at each of said first movable attaching portions and said second movable attaching portions attach said pillar garnish to a frame of the vehicle.

4. The structure for attaching a pillar garnish according to claim 3, wherein a clip used for said first movable attaching portions is resin clip.

5. The structure for attaching a pillar garnish according to claim 3, wherein a clip used for said second movable attaching portions is metal clip.

6. The structure for attaching a pillar garnish according to claim 1, wherein said tongues of said plurality of second movable attaching portions are clamped by clips attachable to the pillar door section, so that said second movable attaching portions are attachable to the pillar door section.

* * * * *